United States Patent [19]

Phifer

[11] Patent Number: 4,953,772

[45] Date of Patent: Sep. 4, 1990

[54] ASHTRAY REPLACEMENT DRINK HOLDER

[76] Inventor: Greg Phifer, Rte. 2, Box 816, Henry, Nebr. 69349

[21] Appl. No.: 930,890

[22] Filed: Nov. 17, 1986

[51] Int. Cl.⁵ .............................................. B60R 7/00
[52] U.S. Cl. .................................. 224/282; 220/85 H
[58] Field of Search ............ 220/85 H; 224/148, 282,
224/279, 281, 273; 296/37.8, 37.12; 108/44, 45;
248/346, 346.1

[56] References Cited

U.S. PATENT DOCUMENTS

| D. 208,318 | 8/1967 | Kirsch | 224/148 X |
|---|---|---|---|
| 1,913,754 | 6/1933 | Grunwald | 224/279 |
| 2,652,838 | 9/1953 | Wolfe | 224/281 X |
| 2,844,346 | 7/1958 | Six | 220/85 H X |
| 3,050,223 | 8/1962 | Scioloro | 224/282 X |
| 3,386,765 | 6/1968 | Drach, Jr. | 296/37.12 |
| 3,423,571 | 1/1969 | Trachtenberg et al. | 224/282 X |
| 3,503,648 | 3/1970 | James | 296/37.12 |
| 3,606,447 | 9/1971 | Ryding | 296/37.12 |
| 4,099,814 | 7/1978 | Hasselberger | 296/37.12 X |
| 4,286,742 | 9/1981 | Pellegrino | 224/281 |
| 4,453,759 | 6/1984 | Kathiria | 296/37.8 |
| 4,535,923 | 8/1985 | Manke | 224/273 |

FOREIGN PATENT DOCUMENTS

| 2489221 | 3/1982 | France | 296/37.8 |
|---|---|---|---|
| 2063779 | 6/1981 | United Kingdom | 296/37.8 |

Primary Examiner—Henry J. Recla
Assistant Examiner—Robert M. Petrik
Attorney, Agent, or Firm—Gilden & Israel

[57] ABSTRACT

Several embodiments of a drink holder are designed to replace a conventional ashtray pivotally or slidably mounted in a vehicle.

1 Claim, 3 Drawing Sheets

ASHTRAY REPLACEMENT DRINK HOLDER

BACKGROUND OF THE INVENTION

1. Field of the Invention

The present invention relates to vehicle drink holders, and more particularly pertains to several embodiments of drink holders which may be pivotally or slidably mounted in the ashtray holding socket of a vehicle.

2. Description of the Prior Art

Various types of food and drink holders utilizable in a vehicle are well known in the prior art. For example, U.S. Pat. No. 3,163,338, which issued to M. Gattsegen on Dec. 29, 1964, discloses a combination vehicular and portable insulated food and beverage container. The container includes a pair of hook members which facilitate a hanging support thereof over a vehicle window, while the container can also be removed from the vehicle when desired. The design of the container is such that it can be hung from any convenient support within the vehicle interior.

This patent is representative of a number of different types of known drink and food supports for vehicles wherein the same are adapted to be conveniently attached to some existing support structure. As can be appreciated, all of these prior art types of food and drink supports take up a substantial amount of room within the vehicle interior and are not particularly stable during periods of vehicle movement. While being functional for their intended purpose, it would be much more convenient if such food and drink holders could be pivotally or slidably mounted within a vehicle dash structure, thereby to allow an unobstructed storing of the devices when not in use. Further, such storing of the devices into a folded out-of-the-way position when not being utilized would be more aesthetically pleasing, and thus there exists a continuing need for such compact and convenient drink holders. In this regard, the present invention substantially fulfills this need.

SUMMARY OF THE INVENTION

In view of the foregoing disadvantages inherent in the known types of vehicle drink holders now present in the prior art, the present invention provides an improved vehicle drink holder construction wherein the same can be fitted into a conventional vehicle ashtray holding compartment when the ashtray is removed therefrom. As such, the general purpose of the present invention, which will be described subsequently in greater detail, is to provide a new and improved vehicle drink holder which has all the advantages of the prior art vehicle drink holders and none of the disadvantages.

To attain this, the present invention comprises several embodiments of drink holders in combination with a support structure which may be pivotally or slidably mounted within an ashtray holding socket located on the dash of a vehicle. In a first embodiment of the invention, the drink holder pivots outwardly in a manner which resembles the replaced ashtray; however, a circular ring mounted within the compartment is designed to retain a drink. In this embodiment of the invention, a conventional ashtray may be modified so as to have the ring mounted therein, thereby to provide the desired drink holding function.

A second embodiment of the invention simply comprises a slidable ashtray having two rings mounted therein, thereby to perform a dual drink holding function. A third embodiment permits the ashtray to continue to function as an ashtray, with a pivotal drink holder being attached thereto. In this respect, a ring member is pivoted outwardly from the ashtray, and a base member is slidable outwardly from a bottom portion of the ashtray, thereby to provide an extended drink holder while the ashtray remains functional for a person who smokes.

A fourth embodiment of the invention, provides for a drink holding ring rotatably mounted within a drawer structure, thereby to allow for some adjustable movement of the retained drink in response to vehicle movement. A fifth and final embodiment of the invention discloses one or more ring members which may be pivoted outwardly from a drawer structure which may rotate about a rod member to compensate for uneven vehicle movement.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide new and improved vehicle drink holders which have all the advantages of the prior art vehicle drink holders and none of the disadvantages.

It is another object of the present invention to provide new and improved vehicle drink holders which may be easily and efficiently manufactured and marketed.

It is a further object of the present invention to provide new and improved vehicle drink holders which are of a durable and reliable construction.

An even further object of the present invention is to provide new and improved vehicle drink holders which are susceptible of a low cost of manufacture with regard to both materials and labor, and which accordingly are then susceptible of low prices of sale to the consuming public, thereby making such vehicle drink holders economically available to the buying public.

Still yet another object of the present invention is to provide new and improved vehicle drink holders which provide in the apparatuses and methods of the prior art some of the advantages thereof, while simultaneously overcoming some of the disadvantages normally associated therewith.

Still another object of the present invention is to provide new and improved vehicle drink holders which are designed to replace conventional vehicle ashtrays These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENTS

Figure 1:
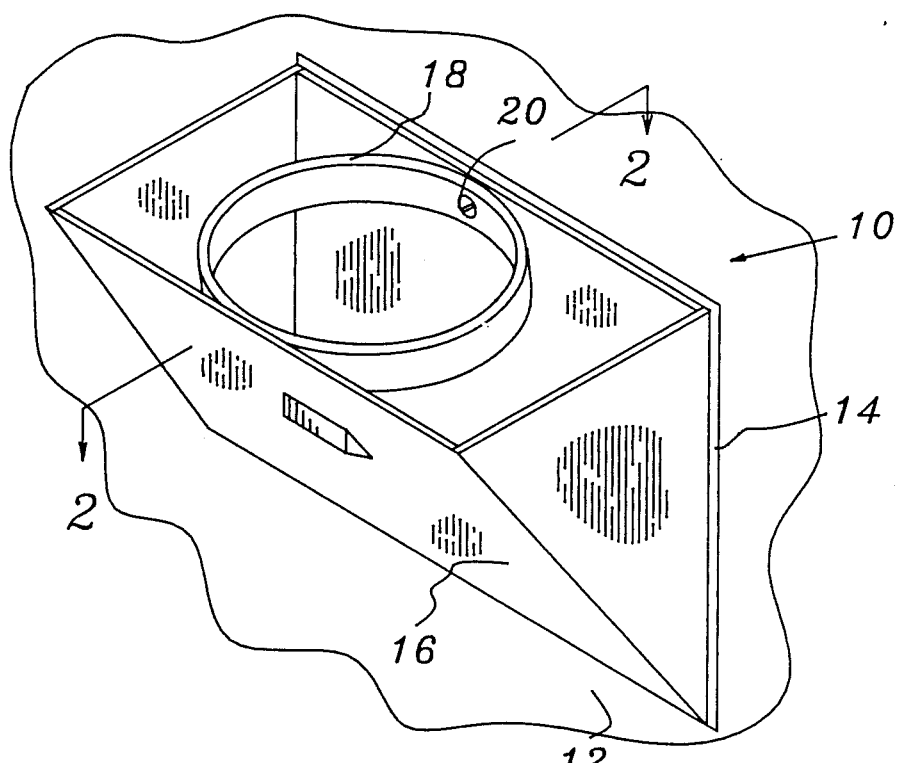
FIG. 1 is a perspective view of a first embodiment of a vehicle drink holder comprising the present invention.
Figure 2:
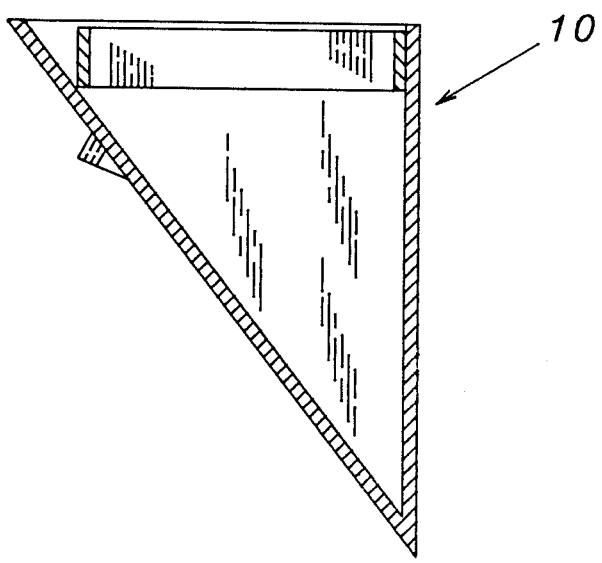
FIG. 2 is a cross-sectional view of the first embodiment of the invention taken along the line 2—2 in FIG. 1.

With reference now to the drawings, and in particular to FIGS. 1 and 2 thereof, a first embodiment of a new and improved vehicle drink holder embodying the principles and concepts of the present invention and generally designated by the reference numeral 10 will be described.

More specifically, it will be noted that the first embodiment 10 of the invention is mounted within a vehicle dash 12. In this regard, the drink holder 10 is mounted within a conventional ashtray retaining slot 14 formed in the dash 12 and would be typically utilized to replace the ashtray after a removal thereof. The drink holder 10 includes a drawer structure 16 pivotally mounted within the slot 14 in a manner similar to the removed ashtray, with a circular drink holding ring 18 being fixedly secured within the drawer. The drink holding ring 18 may be attached within the drawer 16 by any conventional means, such as through the use of one or more threaded fasteners 20.

With respect to the manner of usage of this first embodiment 10 of the invention, it can be appreciated that a glass, drink can, or the like can be positioned within the ring 18 and will be secured therein in an apparent manner. When not in use, the drawer 16 may be folded into the dash 12 so as to provide a conforming and aesthetically pleasing appearance. As can be appreciated, this first embodiment 10 of the invention could be constructed as a kit wherein the drawer 16 could comprise the conventional ashtray with the ring 18 being separately provided. The ashtray or drawer 16 could be modified whereby the ring 18 would be fixedly secured therein by the fastener 20, or by some other conventional fastening means, thereby to form the drink holder structure.

Figure 3:
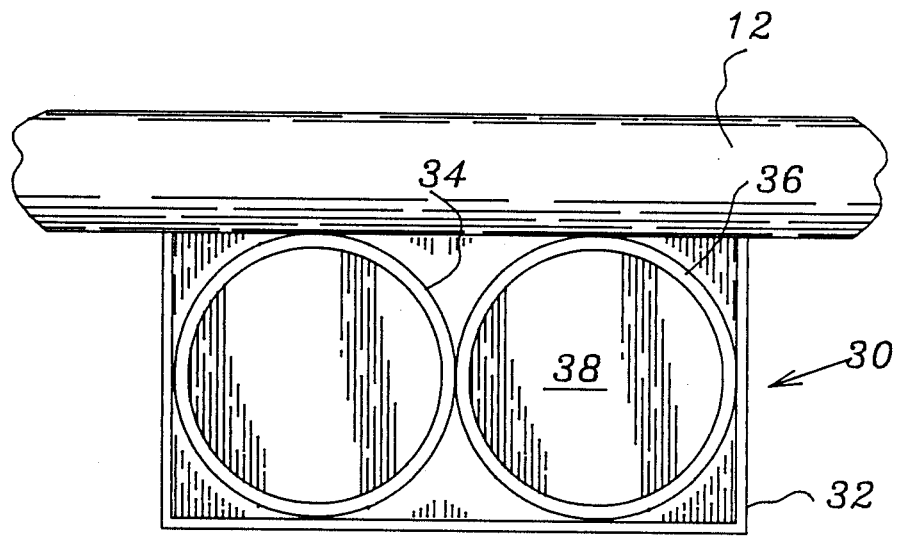
FIG. 3 is a top plan view of a second embodiment of the invention.

FIG. 3 of the drawings illustrates a second embodiment of the invention which is generally designated by the reference numeral 30. This second embodiment of the invention is directed to the construction of a vehicle dash 12 which utilizes a slidable, as opposed to a pivotal, ashtray. In this embodiment, the drink holder 30 essentially comprises a slidable drawer 32 which replaces the normally present drawer-type ashtray, with a pair of drink holding rings 34, 36 being fixedly secured therein by some conventional means. The drink holding rings 34, 36 could extend completely to the bottom floor surface 38 of the drawer 32, or could be similar in appearance to the ring 18 as shown in the first embodiment of the invention. Further, the rings 34, 36 could simply comprise indentations formed in the floor 38 of the drawer 32, thereby to perform the desired drink retaining function. Additionally, it is to be understood that it is within the intent and purview of the present invention to include any number of such drink retaining rings or indentations within a pivotal or slidable drawer structure designed to replace a conventional vehicle ashtray, and the claims appended hereto reflect such intent.

Figure 4:
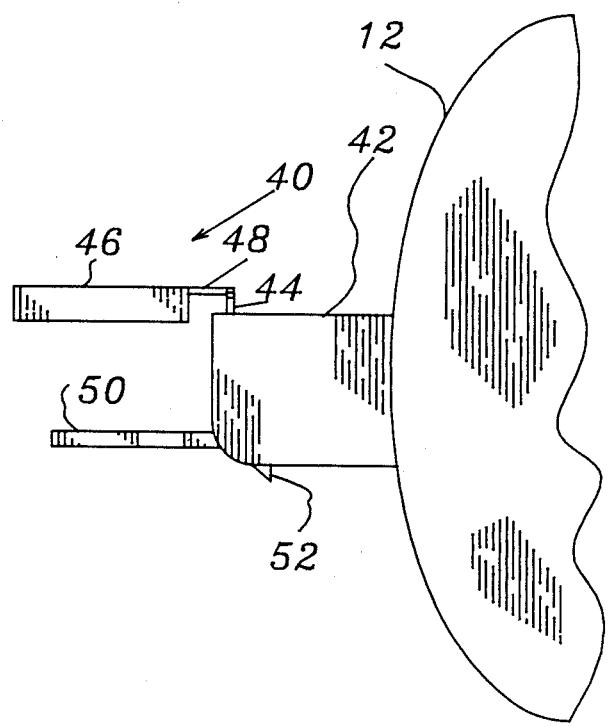
FIG. 4 is a side elevation view of a third embodiment of the invention.

FIG. 4 of the drawings illustrates the third embodiment of the invention which is generally designated by the reference numeral 40. This third embodiment illustrates a slidable drawer structure 42, substantially similar to the slidable drawer 32 shown in FIG. 3, with this drawer being used as a replacement for a conventional ashtray mounted in a vehicle dash 12. The specially designed drawer 42 includes an upstanding support 44 to which a drink holding ring 46 is rotatably mounted. In this regard, the drink retaining ring 46 is mounted to the support 44 by an arm 48. A bottom section of the drawer 42 may include a planar support surface 50 slidable outwardly from a slot formed therein, and a downwardly extending button 52 also retained within the slot formed in the drawer can be utilized to manually slide the support surface into and out of the drawer. In use, it can be appreciated that the support surface 50 would be normally retained within the drawer 42, while the drink retaining ring 46 would also be pivoted inwardly and retained within the drawer. When a drink is to be held by the structure, however, the drawer 42 may be pulled out of the dash 12, the ring 46 is pivoted outwardly as shown in FIG. 4, and the support plate 50 is slid outwardly under the drink retaining ring. A drink may then be retained within the ring 46 while also being supported by the support plate 50.

Figure 5:
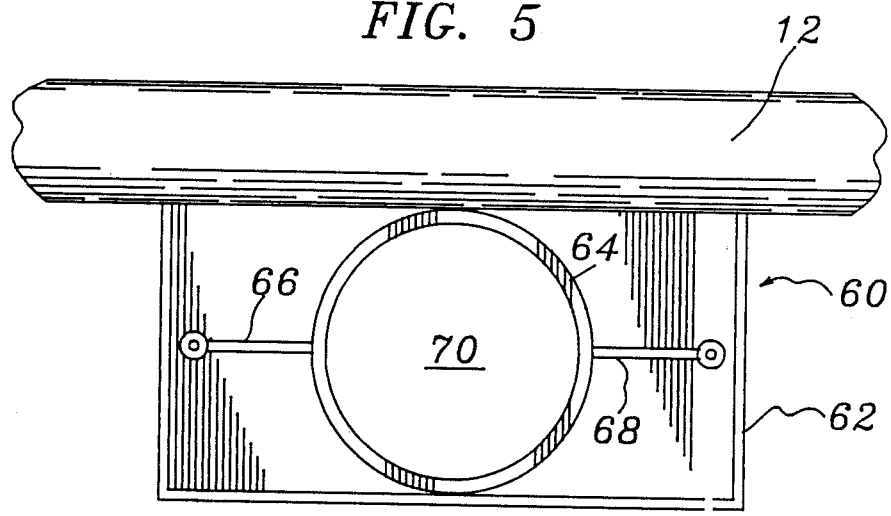
FIG. 5 is a top plan view of a fourth embodiment of the invention.

FIG. 5 of the drawings illustrates a fourth embodiment of the invention generally designated by the reference numeral 60. In this embodiment, a slidable drawer 62 is mounted in the vehicle dash 12 and has a drink retaining ring 64 mounted therein. The drink retaining ring 64 is fixedly secured to a pair of opposed rods 66, 68, with these rods being rotatably mounted to opposed sidewalls of the drawer 62. As such, a drink retained within the ring 64 and supported by a bottom floor surface 70 of the drawer 62 will be permitted to move backwards and forwards in a limited amount to compensate for vehicle movement, inasmuch as the ring 64 will move concurrently with the rotatable movement of the rods 66, 68.

Figure 6:
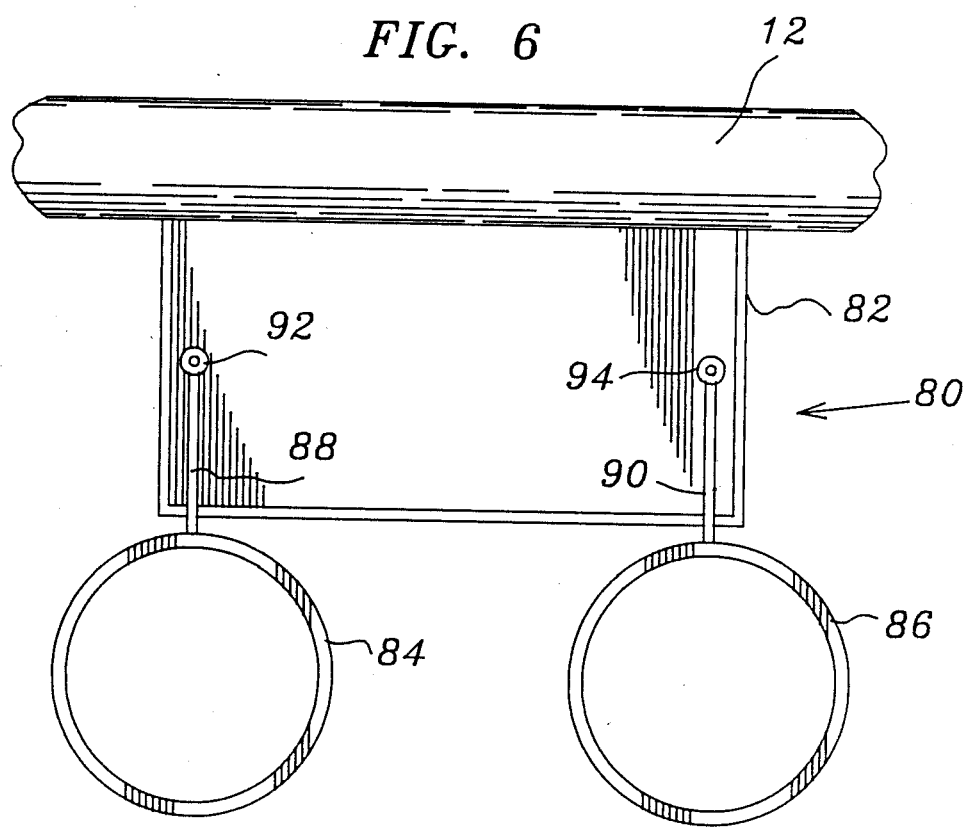
FIG. 6 is a top plan view of a fifth embodiment of the invention.

FIG. 6 of the drawings illustrates a final embodiment of the invention which is generally designated by the reference numeral 80. In this embodiment of the invention, a slidable drawer 82, which replaces a conventional vehicle ashtray, is mounted in the vehicle dash 12 and includes a pair of drink retaining rings 84, 86. The rings 84, 86 are respectively fixedly secured to support rods 88, 90, and these rods are rotatable along an axial length thereof while also being pivotal around their respective attachment points 92, 94. The attachment points 92, 94 represent the means of connecting the rings 84, 86 to the slidable drawer 82. In this embodiment, the drawer 82 may be slid outwardly from the dash, and the drink retainings 84, 86 may then be pivoted outwardly from the drawer so as to retain conically-shaped glasses, or the like, in a conventional manner. Additionally, rotatable movement of the rings 84, 86 is facilitated by the concurrent rotatable movement of the rods 88, 90, thereby to compensate for vehicle movement.

With respect to the manner of usage and operation of the present invention, the same should be apparent from the above description. As such, no further discussion relative to the use and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A drink holder for mounting within a conventional ashtray holding slot formed in a vehicle dash, said drink holder comprising:
   a. drawer positionable within said ashtray holding slot;
   b. drink holding ring securable to said drawer, said drink holding ring being rotatably mounted to said drawer; and,
   c. drink bottom support means slidably attached to a bottom portion of said drawer, said drink bottom support means being positionable beneath said drink holding ring.

* * * * *